(12) United States Patent
Sai et al.

(10) Patent No.: US 12,343,973 B2
(45) Date of Patent: Jul. 1, 2025

(54) LAMINATED MOLDED BODY AND METHOD FOR MANUFACTURING SAME

(71) Applicant: Midori Auto Leather Co., Ltd., Yamagata (JP)

(72) Inventors: Na Sai, Yamagata (JP); Hideharu Higashine, Yamagata (JP)

(73) Assignee: Midori Auto Leather Co., Ltd., Yamagata (JP)

( * ) Notice: Subject to any disclaimer, the term of this patent is extended or adjusted under 35 U.S.C. 154(b) by 480 days.

(21) Appl. No.: 17/778,191

(22) PCT Filed: Nov. 16, 2020

(86) PCT No.: PCT/JP2020/042599
§ 371 (c)(1),
(2) Date: May 19, 2022

(87) PCT Pub. No.: WO2021/100652
PCT Pub. Date: May 27, 2021

(65) Prior Publication Data
US 2022/0410554 A1    Dec. 29, 2022

(30) Foreign Application Priority Data
Nov. 21, 2019    (JP) .................................. 2019-210771

(51) Int. Cl.
*B32B 38/10*    (2006.01)
*B32B 3/10*    (2006.01)
(Continued)

(52) U.S. Cl.
CPC .................. *B32B 38/10* (2013.01); *B32B 3/10* (2013.01); *B32B 3/266* (2013.01); *B32B 5/24* (2013.01);
(Continued)

(58) Field of Classification Search
CPC ........... B32B 38/10; B32B 3/10; B32B 3/266; B32B 5/24; B32B 7/12; B32B 27/40;
(Continued)

(56) References Cited

U.S. PATENT DOCUMENTS

| 4,541,885 A | 9/1985 | Caudill, Jr. |
| 10,118,525 B2 | 11/2018 | Kromm et al. |

(Continued)

FOREIGN PATENT DOCUMENTS

| CN | 109963706 A | 7/2019 |
| DE | 3508125 A1 | 9/1986 |

(Continued)

OTHER PUBLICATIONS

An Office Action mailed by the Japan Patent Office on Jan. 4, 2023, which corresponds to Japanese Patent Application No. 2021-558364 and is related to U.S. Appl. No. 17/778,191; with English translation.

(Continued)

*Primary Examiner* — Christopher W Raimund
(74) *Attorney, Agent, or Firm* — Studebaker Brackett PLLC (57) ABSTRACT

A method for manufacturing a laminated molded body includes a cutting-out step for cutting out a cushion layer to form a cut-out part; a base material laminating step for forming a first laminated body; an insulating material placing step of attaching an insulating material to the cut-out part; a first thermocompression bonding step for bonding the first laminated body by thermocompression; a removing step for removing the cut-out part to form an opening; a skin laminating step for forming a second laminated body; and a second thermocompression bonding step for bonding the skin at the opening part to the lower layer material by bonding the second laminated body by thermocompression, (Continued)

the lower layer material being arranged below the cushion layer having the opening part.

2 Claims, 11 Drawing Sheets

(51) Int. Cl.
*B32B 3/26* (2006.01)
*B32B 5/24* (2006.01)
*B32B 7/12* (2006.01)
*B32B 27/40* (2006.01)
*B32B 37/02* (2006.01)
*B32B 37/12* (2006.01)

(52) U.S. Cl.
CPC .............. *B32B 7/12* (2013.01); *B32B 27/40* (2013.01); *B32B 37/02* (2013.01); *B32B 2037/1215* (2013.01); *B32B 2250/03* (2013.01); *B32B 2250/04* (2013.01); *B32B 2250/44* (2013.01); *B32B 2307/72* (2013.01); *B32B 2307/732* (2013.01); *B32B 2605/003* (2013.01)

(58) Field of Classification Search
CPC ............ B32B 37/02; B32B 2037/1215; B32B 2250/03; B32B 2250/04; B32B 2250/44; B32B 2307/72; B32B 2307/732; B32B 2605/003; B32B 2601/00; B32B 5/022; B32B 5/18; B32B 5/26; B32B 5/32; B32B 2262/0261; B32B 2266/0278; B32B 9/025; B32B 9/04; B32B 9/045; B32B 9/047; B32B 27/08; B32B 27/12; B32B 27/281; B32B 27/304; B32B 27/32; B32B 27/36; B29C 43/183; B29C 65/4815; B29C 69/001; B29C 65/18; B29C 65/5057; B29C 66/1122; B29C 66/234; B29C 66/43; B29C 66/436; B29C 66/71; B29C 66/727; B29C 66/729; B29C 66/7294; B29C 66/7484; B29C 66/919; B29C 66/929; B29C 66/949; B29C 2043/189; B29C 2793/0018; B29C 2793/0081; B29K 2711/08; B29L 2031/58; B29L 2031/771; B60N 2/5891; B60N 2/7017
See application file for complete search history.

(56) References Cited

U.S. PATENT DOCUMENTS

| 2003/0044563 A1 | 3/2003 | Kocinec et al. |
| 2013/0034700 A1 | 2/2013 | Gordon-Duffy et al. |
| 2019/0322072 A1 | 10/2019 | Yoshikawa |
| 2021/0162705 A1 | 6/2021 | Ishiyama et al. |

FOREIGN PATENT DOCUMENTS

| EP | 0345508 A2 | 12/1989 |
| GB | 1293009 A | 10/1972 |
| JP | S51-014939 Y1 | 4/1976 |
| JP | S54-152557 A | 11/1979 |
| JP | S55-124619 A | 9/1980 |
| JP | H07-327786 A | 12/1995 |
| JP | 2003-227020 A | 8/2003 |
| JP | 2011-101959 A | 5/2011 |
| JP | 2012-100910 A | 5/2012 |
| KR | 10-2017-0131984 A | 12/2017 |
| WO | 2011/136990 A1 | 11/2011 |
| WO | 2013/168766 A1 | 11/2013 |
| WO | 2018096944 A1 | 5/2018 |
| WO | 2019065758 A1 | 4/2019 |

OTHER PUBLICATIONS

International Search Report issued in PCT/JP2020/042599; mailed Jan. 26, 2021.

The extended European search report issued by the European Patent Office on Nov. 16, 2023, which corresponds to European Patent Application No. 20890167.8-1012 and is related to U.S. Appl. No. 17/778,191.

An Office Action mailed by China National Intellectual Property Administration on Oct. 12, 2023, which corresponds to Chinese Patent Application No. 202080080355.X and is related to U.S. Appl. No. 17/778,191.

LAMINATED MOLDED BODY AND METHOD FOR MANUFACTURING SAME

CROSS-REFERENCE TO RELATED APPLICATION

The present disclosure is based on and claims priority to Japanese Patent Application No. 2019-210771 filed to Japan Patent Office on Nov. 21, 2019, the disclosure of which is hereby incorporated by reference in its entirety.

TECHNICAL FIELD

The present invention relates to a laminated molded body and a method for manufacturing the same.

BACKGROUND ART

For example, a laminated molded body used for an interior material of a vehicle or the like is known to have irregularities formed on a surface thereof (for example, see Patent Literatures 1 and 2).

Patent Literature 1 (WO 2018/096944 A) discloses a configuration in which irregularities are formed on a laminated molded body by performing a quilting process on urethane foam disposed between two non-woven fabrics and bonding a skin material layer to an upper surface thereof.

Patent Literature 2 (U.S. Pat. No. 10,118,525) discloses a configuration in which irregularities are formed on a laminated molded body by pressing a sheet layer with a mold using a template in which an opening is formed.

SUMMARY

However, the invention disclosed in Patent Literature 1 has an issue that it is difficult to shorten the manufacturing time of the laminated molded body because the quilting process is required to form the irregularities on the laminated molded body.

In addition, the invention disclosed in Patent Literature 2 has an issue that the laminated molded body has a design with the irregularities of an angular, linear, and hard feeling, and a surface of the laminated molded body may be damaged since the irregularities are formed on the laminated molded body by disposing and pressing the sheet layer between a cushion layer provided with projections and the template provided with an opening part having a shape suitable for the projections.

An object of the present invention is to provide a method for manufacturing a laminated molded body that can easily shorten a manufacturing time, and a laminated molded body that has a design with irregularities of a soft feeling and can avoid damage on a surface thereof to improve the appearance of the laminated molded body.

In order to achieve the object, a method for manufacturing a laminated molded body, the method includes a cutting-out step for cutting out a cushion layer to form a cut-out part so that an opening part is formed; a base material laminating step for forming a first laminated body by arranging a base material on a lower surface of the cushion layer cut out in the cutting-out step with an adhesive sheet provided therebetween and having an adhesive force by heating; an insulating material placing step for attaching an insulating material to the cut-out part of the first laminated body; a first thermocompression bonding step for bonding by thermocompression the first laminated body to which the insulating material is attached; a removing step for removing the cut-out part from the first laminated body bonded by thermocompression in the first thermocompression bonding step to form the opening part; a skin laminating step for forming a second laminated body by arranging a skin on an upper surface of the first laminated body from which the cut-out part is removed with an adhesive sheet provided therebetween and having an adhesive force by heating; and a second thermocompression bonding step for bonding the skin at the opening part to a lower layer material by bonding the second laminated body by thermocompression, the lower layer material being arranged below the cushion layer having the opening part.

To achieve the object, a laminated molded body of the present invention includes a cushion layer, a skin bonded to an upper surface of the cushion layer, and a base material bonded to a lower surface of the cushion layer. The cushion layer includes an opening part. The skin is bonded to the base material at the opening part. The cushion layer is formed of polyurethane foam having a thickness of 2 to 15 mm and a density of 20 to 35 kg/m$^3$.

To achieve the object, a laminated molded body of the present invention includes a cushion layer, a skin bonded to an upper surface of the cushion layer, and a base material bonded to a lower surface of the cushion layer. The cushion layer includes a first cushion layer and a second cushion layer arranged on a lower surface of the first cushion layer. At least one of the first cushion layer and the second cushion layer includes a first opening part.

DETAILED DESCRIPTION

Hereinafter, embodiments for implementing a laminated molded body and a method for manufacturing the same according to the present invention will be described with reference to first to fourth embodiments illustrated in the drawings.

First Embodiment

A laminated molded body of a first embodiment is applied to a vehicle seat.

Figure 1:
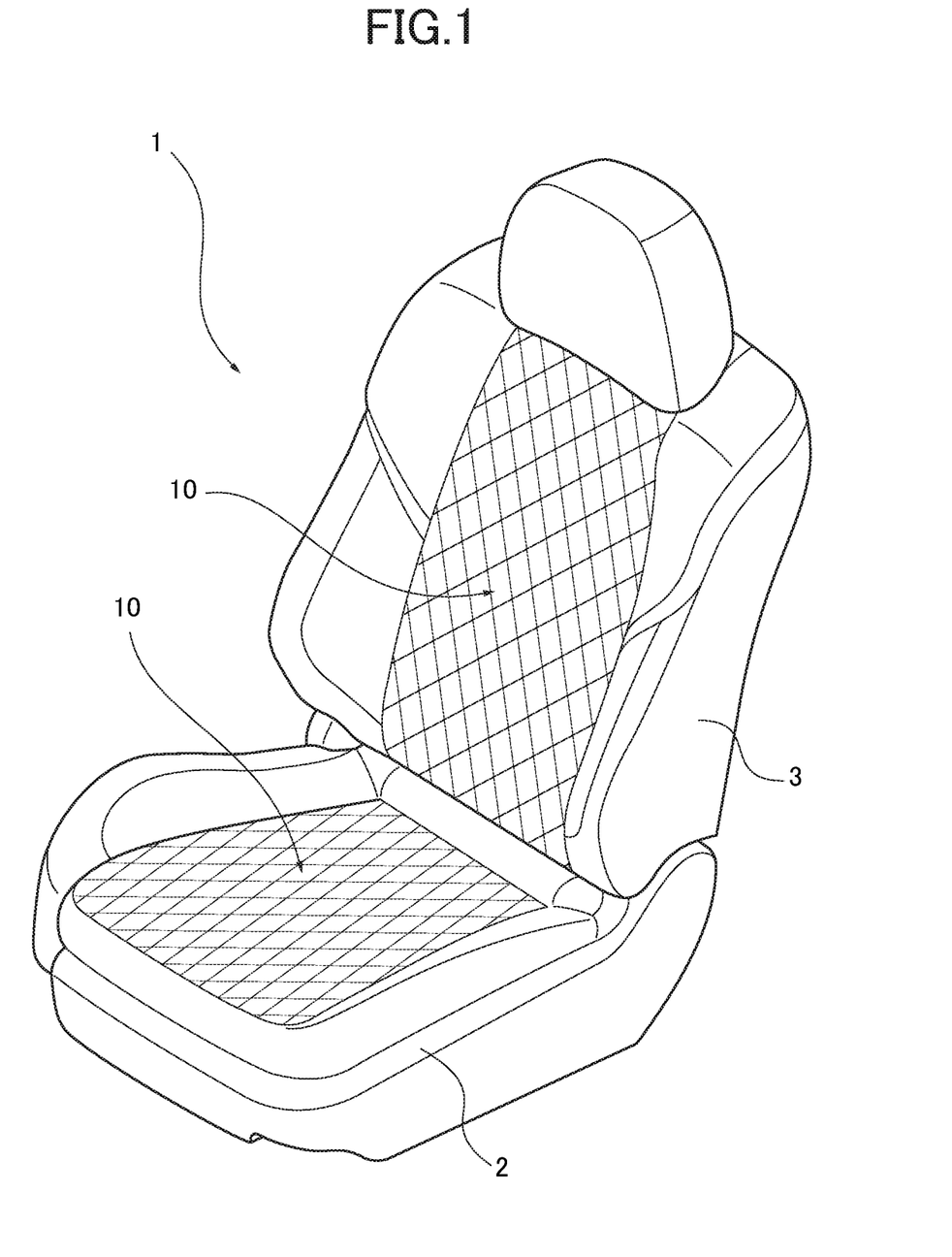
FIG. 1 is a perspective view illustrating a seat of a first embodiment.

(Configuration of Seat) FIG. 1 is a perspective view illustrating a seat of the first embodiment.

Hereinafter, a configuration of the seat of the first embodiment will be described.

As illustrated in FIG. 1, a seat 1 includes a seat part 2 that supports buttocks of an occupant and a back face part 3 that supports a back of the occupant's body.

A laminated molded body 10 is used at a center portion of the seat part 2 in a vehicle width direction and a center portion of the back face part 3 in the vehicle width direction. Note that the laminated molded body 10 may be used at a peripheral part of the seat part 2 and/or at a peripheral part of the back face part.

Figure 2:
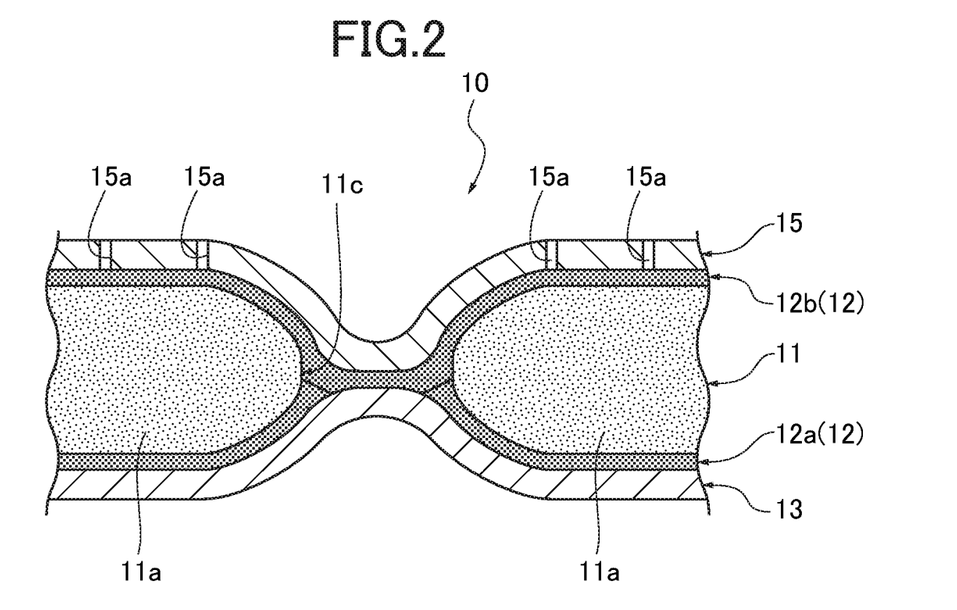
FIG. 2 is a cross-sectional view illustrating a laminated molded body of the first embodiment.

(Configuration of Laminated Molded Body) FIG. 2 is a cross-sectional view illustrating the laminated molded body 10 of the first embodiment. Hereinafter, a configuration of the laminated molded body 10 of the first embodiment will be described.

As illustrated in FIG. 2, the laminated molded body 10 includes a first cushion layer 11 as a cushion layer, a skin 15 arranged on an upper surface of the first cushion layer 11 with a second adhesive layer 12b as an adhesive layer 12 provided therebetween, and a base material 13 arranged on a lower surface of the first cushion layer 11 with a first adhesive layer 12a as the adhesive layer 12 provided therebetween.

The first cushion layer 11 may be formed of, for example, polyurethane foam having a thickness of about 2 to 15 [mm] and a density of 20 to 35 [kg/m$^3$]. The first cushion layer 11 includes a main body part 11a and a first opening part 11c as an opening part.

The first opening part 11c is formed as an opening that penetrates the first cushion layer 11 in a thickness direction thereof. A width of the first opening part 11c may be 70% or more of a thickness of the first cushion layer 11. For example, when the thickness of the first cushion layer 11 is 5 mm, the width of the first opening part 11c may be 7 mm. In addition, when the thickness of the first cushion layer 11 is 10 mm, the width of the first opening part 11c may be 10 mm.

The skin 15 may be formed of, for example, genuine leather. A thickness of the skin 15 may be, for example, about 1 to 1.4 [mm]. Note that the skin 15 may also be formed of synthetic leather, artificial leather, polyvinyl chloride (PVC), cloth, or the like. The skin 15 includes a plurality of through-holes 15a that penetrate the skin 15 in a thickness direction of the skin 15.

The base material 13 may be formed of, for example, nylon. Note that the base material 13 may be formed of a non-woven fabric or the like. The base material 13 may be formed in a mesh shape.

The second adhesive layer 12b is provided between the skin 15 and the main body part 11a of the first cushion layer 11. The first adhesive layer 12a is provided between the main body part 11a of the first cushion layer 11 and the base material 13. At the first opening part 11c of the first cushion layer 11, the skin 15 is bonded to the base material 13 with the second adhesive layer 12b to form irregularities, i.e., concave and convex portions, on the laminated molded body 10.

Figure 3:
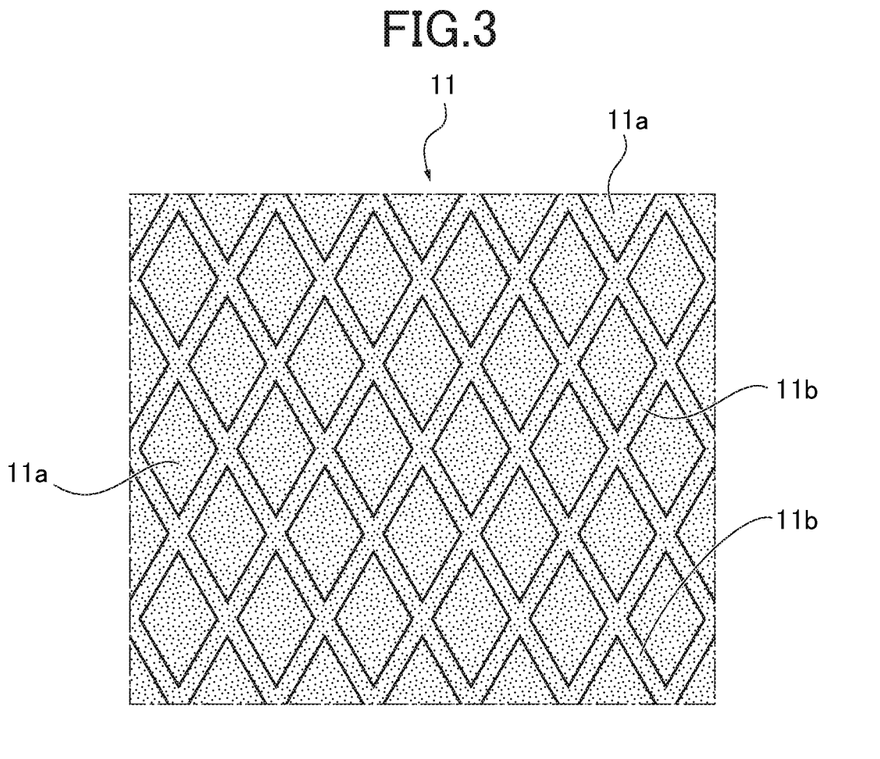
FIG. 3 is a plan view illustrating a first cushion layer cut out in a cutting-out step of the first embodiment.
Figure 4:
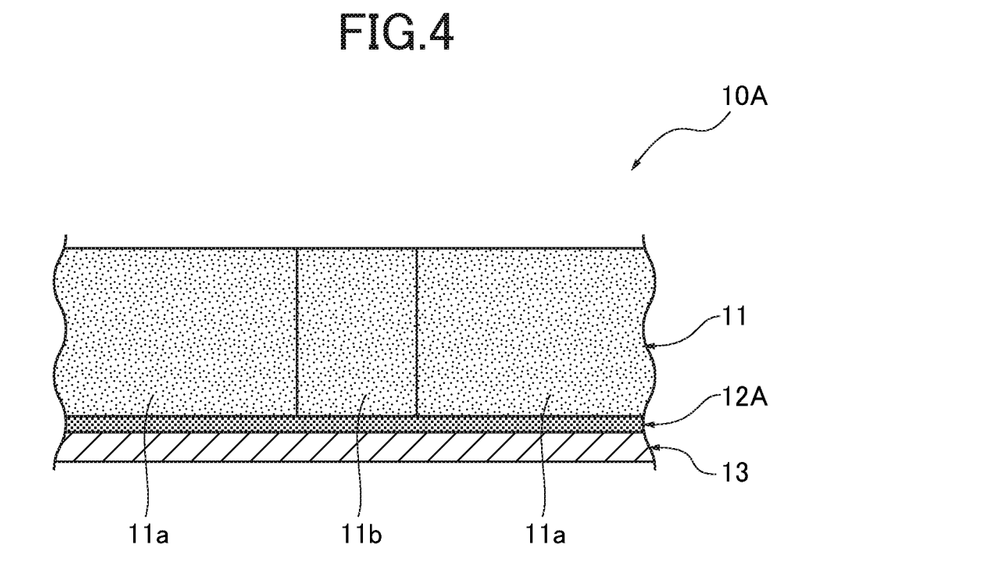
FIG. 4 is a cross-sectional view illustrating a base material attaching step of the first embodiment.
Figure 5:
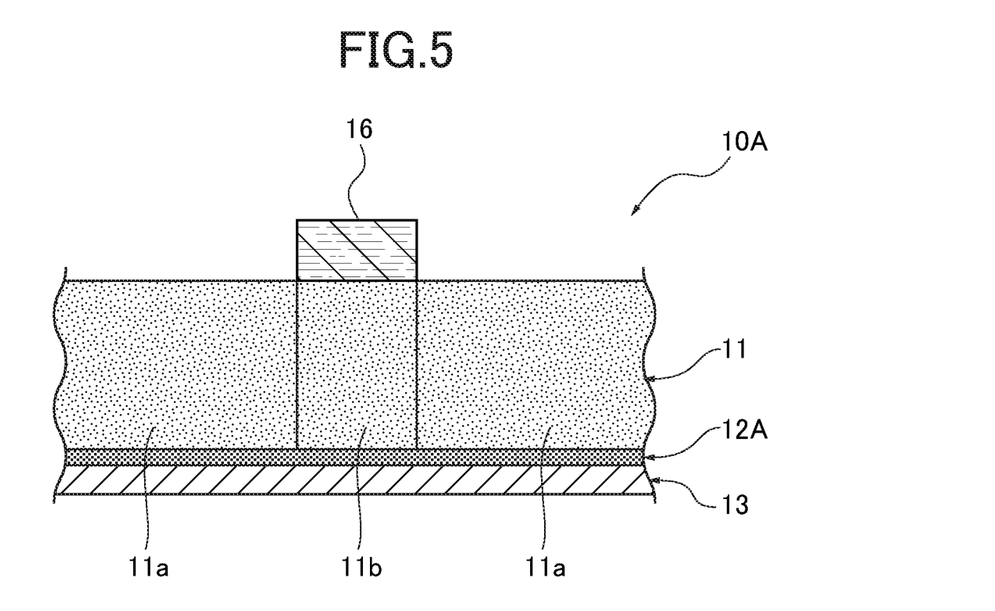
FIG. 5 is a cross-sectional view illustrating an insulating material placing step of the first embodiment.
Figure 6:
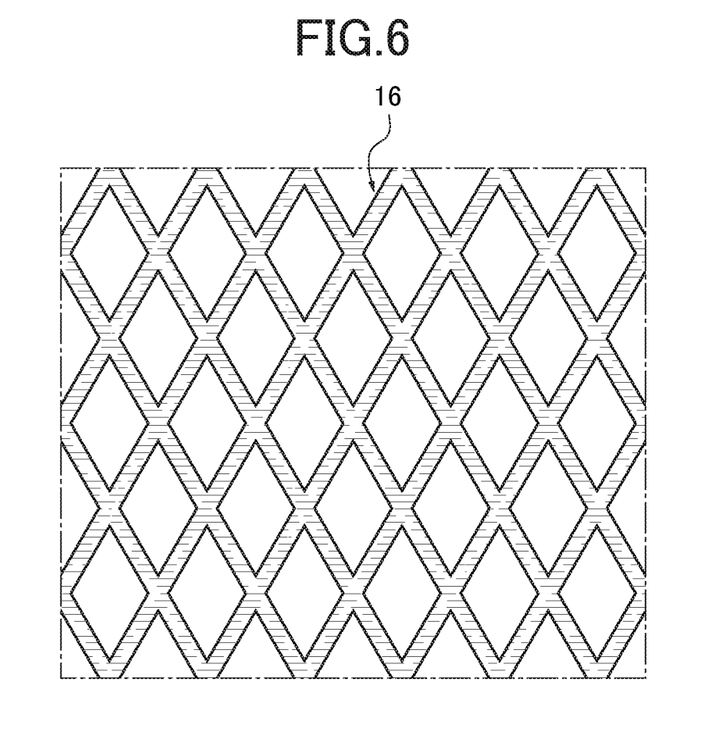
FIG. 6 is a plan view illustrating an insulating material used in the insulating material placing step of the first embodiment.
Figure 7:
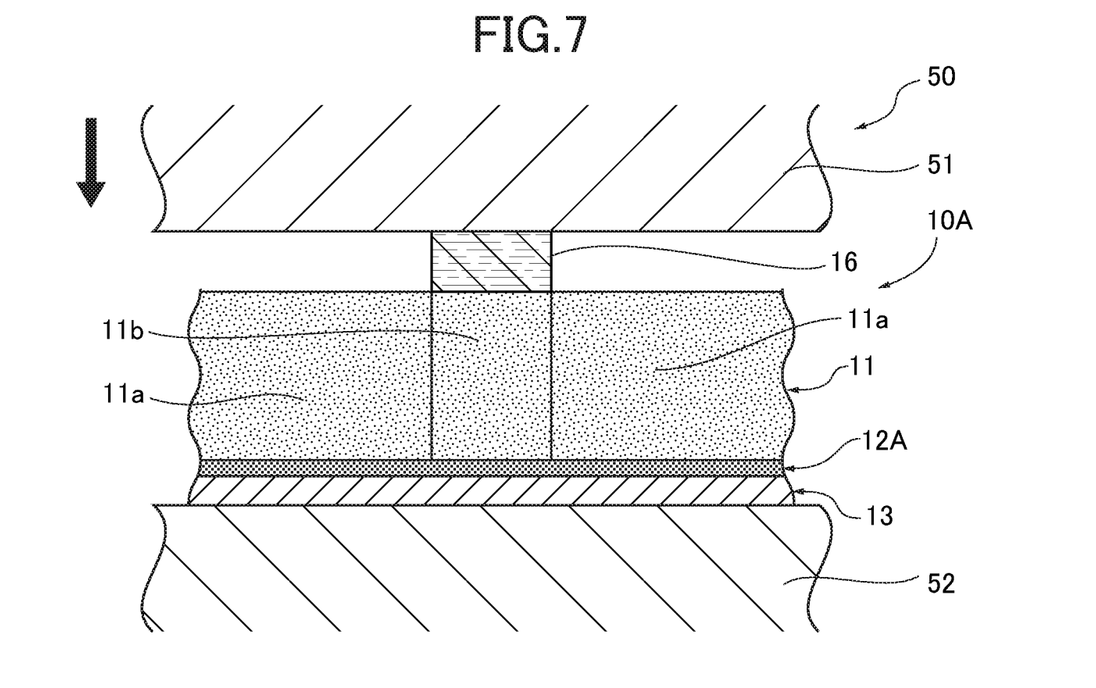
FIG. 7 is a cross-sectional view illustrating a first thermocompression bonding step of the first embodiment.
Figure 8:
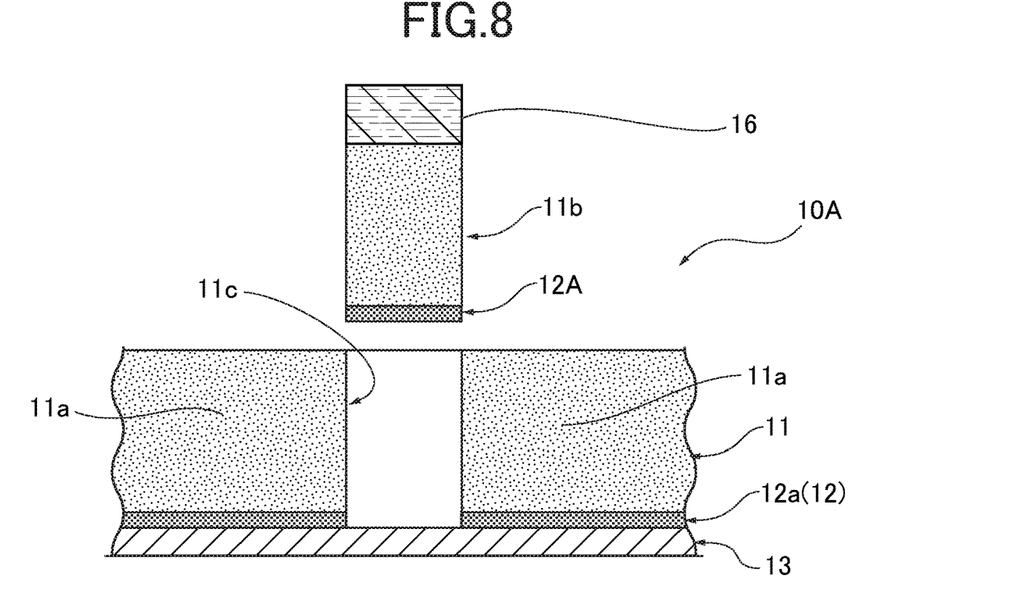
FIG. 8 is an explanatory view illustrating a removing step of the first embodiment.
Figure 9:
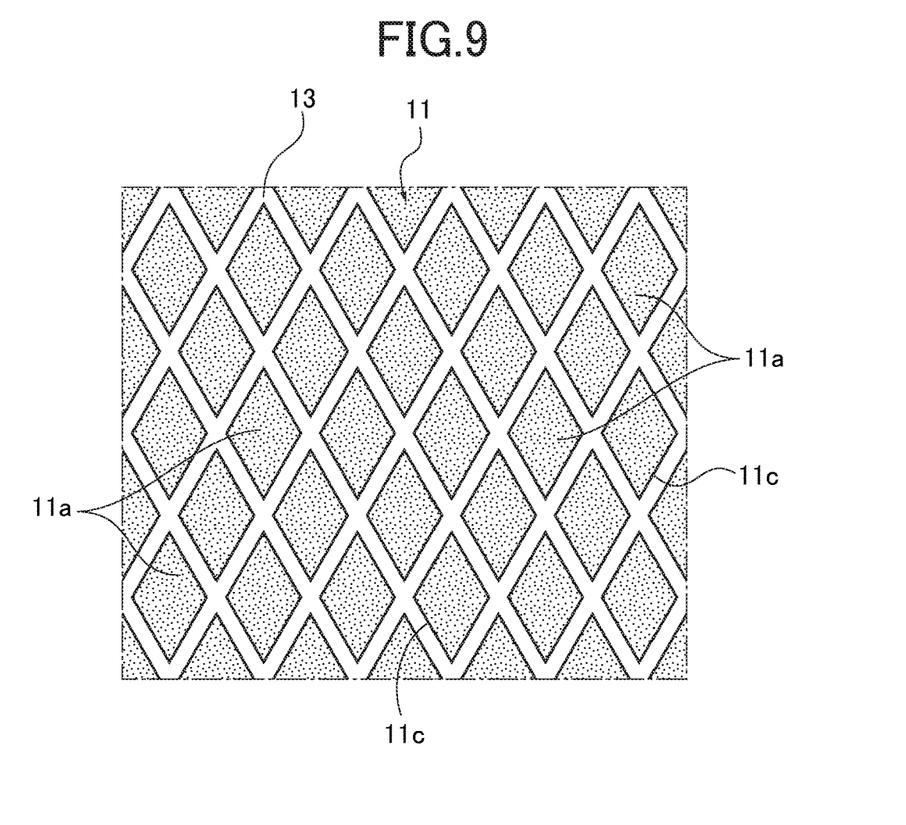
FIG. 9 is a plan view illustrating a first laminated body from which a cut-out part is removed in the removing step of the first embodiment.
Figure 10:
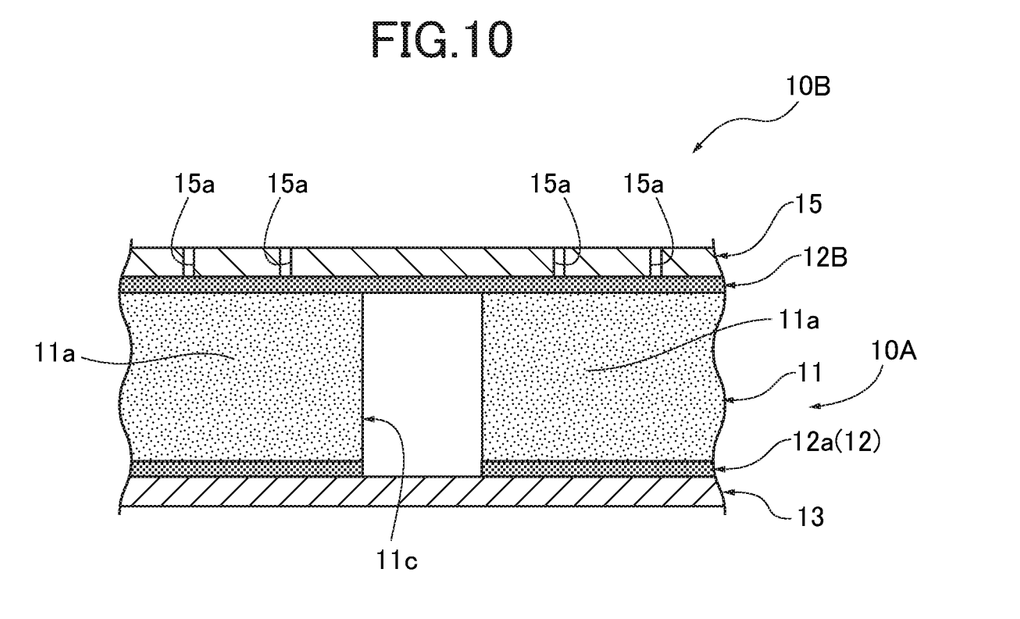
FIG. 10 is a cross-sectional view illustrating a skin laminating step of the first embodiment.
Figure 11:
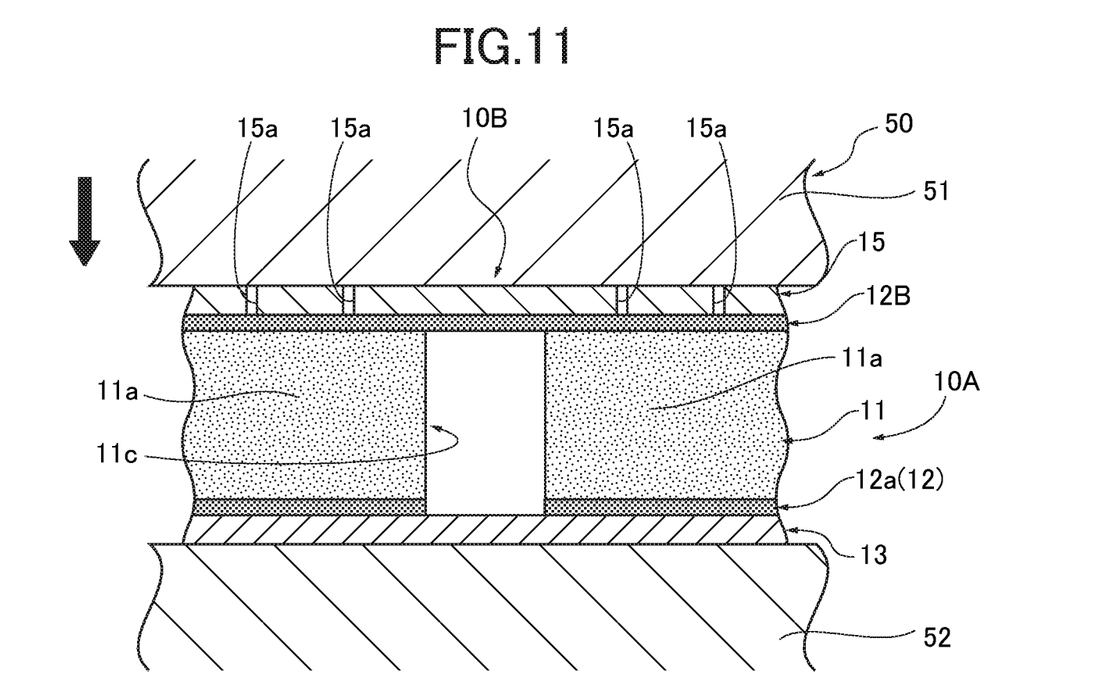
FIG. 11 is a cross-sectional view illustrating a second thermocompression bonding step of the first embodiment.

(Method for Manufacturing Laminated Molded Body) FIG. 3 is a plan view illustrating the first cushion layer 11 cut out in a cutting-out step of the first embodiment. FIG. 4 is a cross-sectional view illustrating a base material attaching step of the first embodiment. FIG. 5 is a cross-sectional view illustrating an insulating material placing step of the first embodiment. FIG. 6 is a plan view illustrating an insulating material used in the insulating material placing step of the first embodiment. FIG. 7 is a cross-sectional view illustrating a first thermocompression bonding step of the first embodiment. FIG. 8 is an explanatory view illustrating a removing step of the first embodiment. FIG. 9 is a plan view illustrating a first laminated body from which a cut-out part is removed in the removing step of the first embodiment. FIG. 10 is a cross-sectional view illustrating a skin laminating step of the first embodiment. FIG. 11 is a cross-sectional view illustrating a second thermocompression bonding step of the first embodiment. Hereinafter, a method for manufacturing the laminated molded body 10 of the first embodiment will be described.

(Cutting-Out Step) As illustrated in FIG. 3, in the cutting-out step, to form the first opening part 11c (see FIG. 9), the first cushion layer 11 having a rectangular plate shape is cut out, thereby, a plurality of rhombic main body parts 11a and a plurality of cut-out parts 11b are formed.

By removing (separating) the cut-out parts 11b from the first cushion layer 11, the first opening part 11c is formed between the main body parts 11a. Note that in the cutting-out step, the cut-out parts 11b are not removed from the first cushion layer 11.

(Base Material Laminating Step) As illustrated in FIG. 4, in the base material laminating step, the base material 13 is arranged on a lower surface of the first cushion layer 11 cut out in the cutting-out step with the first adhesive sheet 12A as an adhesive sheet provided therebetween to form a first laminated body 10A. That is, the base material 13 is arranged on the lower surfaces of the main body part 11a and the cut-out part 11b with the first adhesive sheet 12A to form the first laminated body 10A.

A thermoplastic sheet that has an adhesive force when being melted by heating may be used as the first adhesive sheet 12A. For example, such a thermoplastic sheet may include a polyimide-based, polyolefin-based, polyurethane-based, or polyester-based hot-melt adhesive. A temperature (melting range) at which the hot melt of the hot melt adhesive melts may be 90 to 115° C. As the first adhesive sheet 12A, for example, a web-shaped (spiderweb-shaped) sheet, a net-shaped (mesh-shaped) sheet, or a film-shaped sheet may be used. A web-shaped or net-shaped sheet is preferable from the viewpoint of air permeability.

The first adhesive sheet 12A melts by heating, and the first adhesive layer 12a is formed as the adhesive layer 12.

(Insulating Material Placing Step) As illustrated in FIG. 5, in the insulating material placing step, an insulating material 16 is placed on an upper surface of the cut-out part 11b of the first laminated body 10A. As the insulating material 16, for example, about three sheets of the same material having the same thickness as the skin 15 may be used.

As illustrated in FIGS. 5 and 6, the insulating material 16 is formed in substantially the same size (width) as the cut-out part 11b in the width direction. That is, the insulating material 16 is formed in a shape surrounding the main body parts 11a.

(First Thermocompression Bonding Step) As illustrated in FIG. 7, in the first thermocompression bonding step, the first laminated body 10A to which the insulating material 16 is attached is set in a mold 50 and is bonded by thermocompression. The mold 50 includes an upper mold 51 and a lower mold 52. The upper mold 51 has a heating function. Dividing surfaces (parting surfaces) of the upper mold 51 and the lower mold 52 are formed substantially flat. In the first thermocompression bonding step, for example, bonding by thermocompression is performed at a temperature of 120 to 140° C. and a pressure of 0.1 to 0.8 MPa for 5 to 40 seconds.

When the first laminated body 10A is bonded by thermocompression in the first thermocompression bonding step, a portion of the first adhesive sheet 12A adjacent to the main body part 11a with no insulating material 16 melts and the first adhesive layer 12a having an adhesive force is formed. Therefore, the main body part 11a is bonded to the base material 13.

On the other hand, a portion of the first adhesive sheet 12A adjacent to the cut-out part 11b with the insulating material 16 does not melt because of the insulating material 16 and remains as the first adhesive sheet 12A that does not exhibit an adhesive force. Therefore, the cut-out part 11b is not bonded to the base material 13.

(Removing Step) As illustrated in FIG. 8, in the removing step, the cut-out part 11b to which the insulating material 16 is attached is removed from the first laminated body 10A bonded by thermocompression in the first thermocompression bonding step. In this case, the first adhesive sheet 12A adjacent to the cut-out part 11b is also removed. Note that the first adhesive sheet 12A adjacent to the cut-out part 11b may remain on the base material 13 without being removed.

Therefore, in the first cushion layer 11, as illustrated in FIGS. 8 and 9, the first opening part 11c is formed between the main body parts 11a.

(Skin Laminating Step) As illustrated in FIG. 10, in the skin laminating step, a second laminated body 10B is formed by arranging the skin 15 on an upper surface of the first laminated body 10A from which the cut-out part 11b is removed with a second adhesive sheet 12B as an adhesive sheet provided therebetween. The second adhesive sheet 12B melts by heating, and the second adhesive layer 12b having an adhesive force is formed as the adhesive layer 12.

(Second Thermocompression Bonding Step) As illustrated in FIG. 11, in the second thermocompression bonding step, the second laminated body 10B is set in the mold 50 and is bonded by thermocompression. In the second thermocompression bonding step, for example, bonding by thermocompression is performed at a temperature of 140 to 160° C. and a pressure of 0.5 to 1.2 MPa for 10 to 40 seconds.

When the second laminated body 10B is bonded by thermocompression in the second thermocompression bonding step, a portion of the second adhesive sheet 12B adjacent to the main body part 11a melts, and the second adhesive layer 12b having an adhesive force is formed. Thereby, the main body part 11a is bonded to the skin 15.

In addition, the second adhesive sheet 12B adjacent to the first opening part 11c also melts, and the second adhesive layer 12b having an adhesive force is formed. Therefore, as illustrated in FIG. 2, the skin 15 is bonded to the base material 13 which is a lower layer material at the first opening part 11c. Specifically, the skin 15 is bonded to the base material 13 arranged below the first cushion layer 11 which includes the first opening part 11c.

The laminated molded body 10 is manufactured through the above steps.

(Effect of Laminated Molded Body) Hereinafter, an effect of the laminated molded body 10 of the first embodiment will be described. The method for manufacturing the laminated molded body 10 of the first embodiment includes a cutting-out step for cutting out the cushion layer (first cushion layer 11) to form the cut-out part 11b so that the opening part (first opening part 11c) is formed; a base material laminating step for forming the first laminated body 10A by arranging the base material 13 on the lower surface of the cushion layer (first cushion layer 11) cut out in the cutting-out step with an adhesive sheet (first adhesive sheet 12A) provided therebetween and having an adhesive force by heating; an insulating material placing step for attaching the insulating material 16 to the cut-out part 11b of the first laminated body 10A; a first thermocompression bonding step for bonding, by thermocompression, the first laminated body 10A to which the insulating material 16 is attached; a removing step for removing the cut-out part 11b from the first laminated body 10A bonded by thermocompression in the first thermocompression bonding step to form the opening (first opening part 11c); a skin laminating step for forming the second laminated body 10B by arranging the skin 15 on the upper surface of the first laminated body 10A from which the cut-out part 11b is removed with the adhesive sheet (second adhesive sheet 12B) provided therebetween and having an adhesive force by heating; and a second thermocompression bonding step for bonding the skin 15 at the opening part (first opening part 11c) to the lower layer material (base material 13) by bonding the second laminated body 10B by thermocompression, the lower layer material (base material 13) being arranged below the cushion layer (first cushion layer 11) having the opening part (first opening part 11c) (FIGS. 2 to 11).

By bonding the skin 15 at the opening part (first opening part 11c) to the lower layer material (base material 13) arranged below the cushion layer (first cushion layer 11) having the opening part (first opening part 11c), the irregularities, i.e., concave and convex portions can be formed on the laminated molded body 10. Therefore, it is possible to form the laminated molded body 10 having irregularities of a soft feeling without damaging the surface of the skin 15. Thereby, the appearance of the laminated molded body 10 can be improved.

In addition, it is possible to manufacture the laminated molded body 10 having irregularities without performing a troublesome operation such as applying an adhesive to the back surface of the cut-out cushion layer (first cushion layer 11). In addition, it is possible to manufacture the laminated molded body 10 having irregularities without performing a quilting process which takes time for the operation. Therefore, the manufacturing time of the laminated molded body 10 can be shortened.

In the method for manufacturing the laminated molded body 10 of the first embodiment, in the second thermocompression bonding step, a mold having flat dividing surfaces is used, and the opening part has a width of 70% or more of a thickness of the cushion layer (FIG. 11).

In the second thermocompression bonding step, when the mold having flat dividing surfaces is used and the skin is bonded to the lower layer material, even if the cushion layer is crushed and protrudes into the opening part, it is possible to prevent the opening part from being entirely blocked. Therefore, in the second thermocompression bonding step, the skin can be firmly bonded to the lower layer material by using the mold having flat dividing surfaces.

The laminated molded body 10 of the first embodiment includes the cushion layer, the skin bonded to the upper surface of the cushion layer, and the base material bonded to the lower surface of the cushion layer, the cushion layer includes an opening part, the skin is bonded to the base material at the opening part, and the cushion layer is formed of polyurethane foam having a thickness of 2 to 15 mm and a density of 20 to 35 kg/m³ (FIG. 2).

In a case where polyurethane foam having a thickness of 2 to 15 mm and a density of less than 20 kg/m³ is used for the cushion layer, when the skin is bonded to the base material through the opening part formed in the cushion layer, the cushion layer provided between the skin and the base material is crushed, and irregularities are not formed on the surface of the skin.

On the other hand, in the first embodiment, the polyurethane foam having a thickness of 2 to 15 mm and a density of 20 kg/m³ or more is used for the cushion layer. Accordingly, when the skin is bonded to the base material through the opening part, the cushion layer provided between the skin and the base material has a certain degree of repulsive force, and thus, the cushion layer is slightly crushed. Therefore, smooth irregularities, i.e., concave and convex portions can be formed on the surface of the skin.

In addition, in a case where polyurethane foam having a thickness of 2 to 15 mm and a density of more than 35 kg/m³ is used for the cushion layer, when the skin is bonded to the base material through the opening part formed in the cushion layer, the cushion layer has a large repulsive force, and thus, the skin is separated from the base material and irregularities are not formed on the surface of the skin.

On the other hand, in the first embodiment, the polyurethane foam having a thickness of 2 to 15 mm and a density of 35 kg/m³ or less is used for the cushion layer. Accordingly, when the skin is bonded to the base material through the opening part, the repulsive force of the cushion layer can be reduced, and the skin can be prevented from being separated from the base material. Therefore, smooth irregularities can be formed on the surface of the skin.

That is, it is possible to form smooth irregularities, i.e., concave and convex portions on the surface of the skin with a simple configuration and to obtain a design having a soft feeling without performing a quilting process which takes time for an operation. In addition, the thermocompression bonding is performed using the mold having the flat dividing surfaces without using a template, resulting in no risk of damaging the surface of the skin 15. Therefore, it is possible to improve the appearance of the laminated molded body and shorten the manufacturing time.

Second Embodiment

A laminated molded body of a second embodiment is different from the laminated molded body of the first embodiment in that a configuration of a cushion layer is different.

Figure 12:
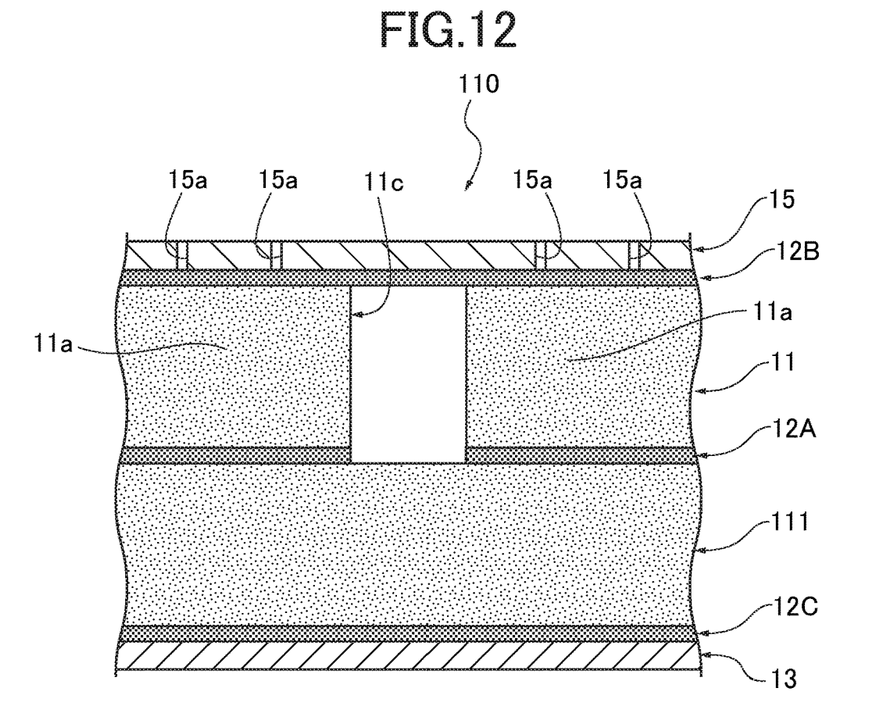
FIG. 12 is a cross-sectional view illustrating an arrangement of a laminated molded body of a second embodiment.
Figure 13:
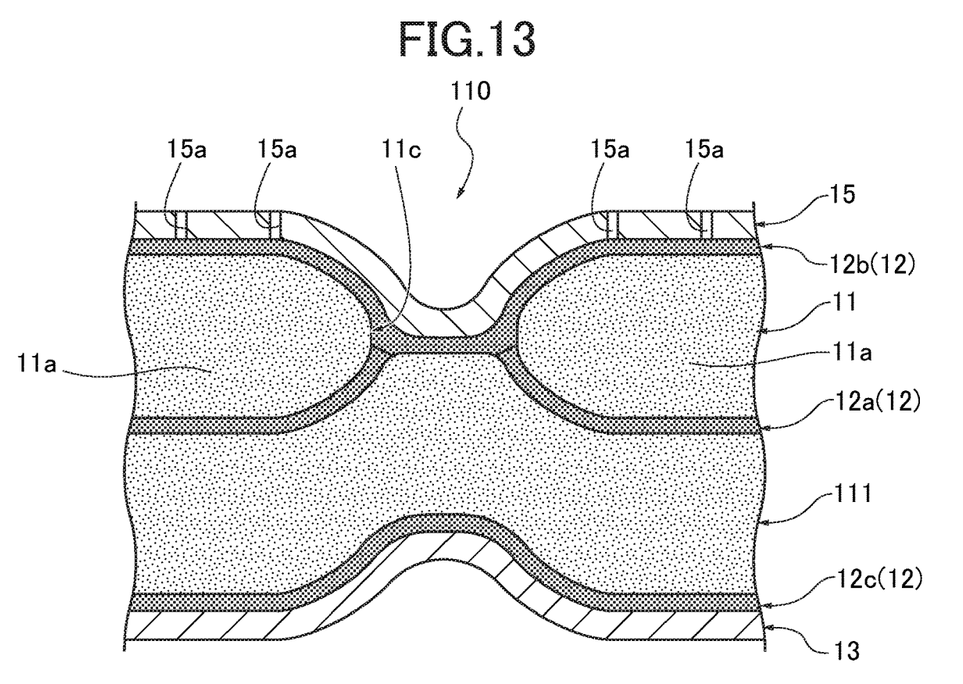
FIG. 13 is a cross-sectional view illustrating the laminated molded body of the second embodiment.

(Configuration of Laminated Molded Body) FIG. 12 is a cross-sectional view illustrating an arrangement of the laminated molded body of the second embodiment. FIG. 13 is a cross-sectional view illustrating the laminated molded body of the second embodiment. Hereinafter, a configuration of the laminated molded body of the second embodiment will be described. Note that descriptions of the same or equivalent parts as those described in the embodiment described above will be described using the same terms or the same reference numerals.

As illustrated in FIG. 12, a laminated molded body 110 of the second embodiment includes a first cushion layer 11 as a cushion layer, a skin 15 arranged on an upper surface of the first cushion layer 11 with a second adhesive sheet 12B as an adhesive sheet provided therebetween, a second cushion layer 111 arranged on a lower surface of the first cushion layer 11 as a cushion layer with a first adhesive sheet 12A as an adhesive sheet provided therebetween, and a base material 13 arranged on a lower surface of the second cushion layer 111 with a third adhesive sheet 12C as an adhesive sheet.

The first cushion layer 11 has the same configuration as the first cushion layer 11 of the first embodiment and includes a first opening part 11c.

The second cushion layer 111 can be formed of, for example, polyurethane foam having a rectangular plate shape. The second cushion layer 111 can be formed of, for example, polyurethane foam having a thickness of about 2 to 15 [mm] and a density of 20 to 35 [kg/m³].

The skin 15 may include a plurality of through-holes 15a penetrating the skin 15 in a thickness direction thereof. The plurality of through-holes 15a is configured as performance holes. The base material 13 may be formed in a mesh shape.

The laminated molded body 110 arranged as described above is set in a mold 50 and is bonded by thermocompression, thereby the skin 15 and the main body part 11a of the first cushion layer 11 are bonded to each other with a second adhesive layer 12b provided therebetween as illustrated in FIG. 13. In addition, the skin 15 is bonded to the second cushion layer 111 at the first opening part 11c of the first cushion layer 11 with the second adhesive layer 12b provided between the skin 15 and the second cushion layer 111. The first cushion layer 11 and the second cushion layer 111 are bonded to each other with the first adhesive layer 12a provided therebetween. The second cushion layer 111 and the base material 13 are bonded to each other with a third adhesive layer 12c provided therebetween.

(Effect of Laminated Molded Body) Hereinafter, an effect of the laminated molded body 110 of the second embodiment will be described. The laminated molded body 110 of the second embodiment includes the cushion layer, the skin 15 bonded to the upper surface of the cushion layer, and the base material 13 bonded to the lower surface of the cushion layer. The cushion layer includes the first cushion layer 11 and the second cushion layer 111 arranged on the lower surface of the first cushion layer. The first cushion layer 11 includes the first opening part 11c (FIG. 3).

The first cushion layer 11 includes the first opening part 11c. Accordingly, it is possible to form irregularities, i.e., concave and convex portions on the surface of the skin 15 with a simple configuration without performing a quilting process which takes time for an operation. In addition, the cushion layer includes the second cushion layer 111. Accordingly, the cushioning properties of the laminated molded body 110 can be improved. Therefore, it is possible to obtain the laminated molded body 110 having the irregularities of a soft feeling with improved cushioning properties with the simple configuration. As a result, it is possible to improve the appearance of the laminated molded body 110 and shorten the manufacturing time.

In the laminated molded body 110 of the second embodiment, the skin 15 is bonded to the second cushion layer 111 at the first opening part 11*c*.

The skin 15 is bonded to the second cushion layer 111 at the first opening part 11*c*, and accordingly, the irregularities can be formed on the surface of the skin 15 with the simple configuration. In addition, the cushion layer includes the second cushion layer 111, and accordingly, the cushioning properties of the laminated molded body 110 can be improved. Therefore, it is possible to obtain the laminated molded body 110 having the irregularities having improved cushioning properties with the simple configuration.

In a case where irregularities, i.e., concave and convex portions are formed on the laminated molded body, it is considered to perform a quilting process on the laminated molded body. However, a lot of operation time is required in the quilting process.

On the other hand, in the laminated molded body 110 of the second embodiment, the skin 15 is bonded to the second cushion layer 111 at the first opening part 11*c*. Accordingly, the irregularities can be formed on the laminated molded body 110 without performing a quilting processing. Therefore, the manufacturing time of the laminated molded body 110 having irregularities can be shortened.

In addition, in the laminated molded body subjected to the quilting process, urethane in the vicinity of a stitch is compressed by two non-woven fabrics and the stitch, and elasticity of the laminated molded body is impaired. In particular, in the laminated molded body subjected to the quilting process, the non-woven fabric is provided between the cushion layer and the skin, and as a result, the elasticity of the laminated molded body is impaired. Therefore, the soft texture of the laminated molded body is impaired.

On the other hand, in the laminated molded body 110 of the second embodiment, a quilting process is not performed, and no non-woven fabric is provided between the cushion layer and the skin 15. Therefore, a soft texture of the laminated molded body 110 can be obtained.

In addition, in a case where a quilting process is performed on the cushion layer provided between two non-woven fabrics and the skin is bonded to an upper surface thereof, a stitch mark is formed on the surface of the skin.

On the other hand, the laminated molded body 110 of the second embodiment is not subjected to a quilting process, and accordingly, a stitch mark is not formed on the surface of the skin 15. Therefore, the design of the laminated molded body 110 can be improved.

In addition, in a case where a quilting process is performed on the cushion layer provided between two non-woven fabrics and the skin is bonded to an upper surface thereof, the non-woven fabrics are provided between the cushion layer and the skin, and thus, air permeability of the laminated molded body is not excellent.

On the other hand, in the laminated molded body 110 of the second embodiment, no non-woven fabric is provided between the cushion layer and the skin 15. Therefore, the air permeability of the laminated molded body 110 can be improved.

In the laminated molded body 110 of the second embodiment, the base material 13 is formed in a mesh shape.

By forming the base material 13 in a mesh shape, the air permeability of the laminated molded body 110 can be improved.

In the laminated molded body 110 of the second embodiment, the skin 15 includes the plurality of through-holes 15*a*.

By forming the plurality of through-holes 15*a* in the skin 15, the air permeability of the laminated molded body 110 can be improved.

Note that other configurations and effects are substantially the same as those in the embodiment described above, and thus, the description thereof will be omitted.

Third Embodiment

A laminated molded body of a third embodiment is different from the laminated molded bodies of the first and second embodiments in that a configuration of a cushion layer is different.

Figure 14:
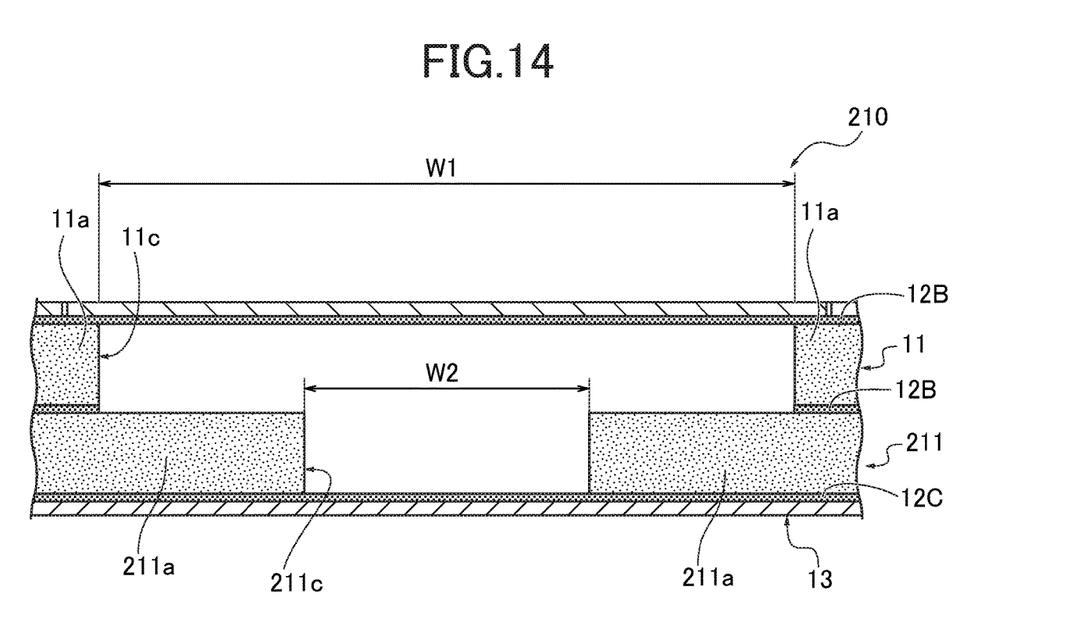
FIG. 14 is a cross-sectional view schematically illustrating an arrangement of a laminated molded body of a third embodiment.
Figure 15:
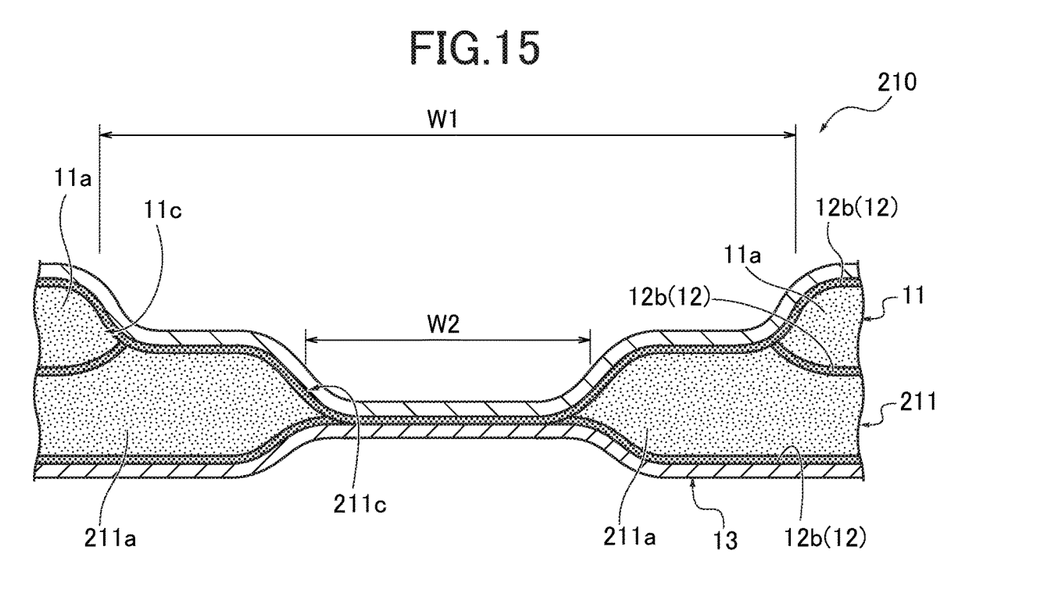
FIG. 15 is a cross-sectional view schematically illustrating the laminated molded body of the third embodiment.

(Configuration of Laminated Molded Body) FIG. 14 is a cross-sectional view schematically illustrating an arrangement of the laminated molded body of the third embodiment. FIG. 15 is a cross-sectional view schematically illustrating the laminated molded body of the third embodiment. Hereinafter, a configuration of the laminated molded body of the third embodiment will be described. Note that descriptions of the same or equivalent parts as those described in the embodiment described above will be described using the same terms or the same reference numerals.

As illustrated in FIG. 14, a laminated molded body 210 of the third embodiment includes a first cushion layer 11 as a cushion layer and a second cushion layer 211 as a cushion layer.

The first cushion layer 11 has the same configuration as the first cushion layer 11 of the first embodiment and includes a first opening part 11*c*.

The second cushion layer 211 includes a main body part 211*a* and a second opening part 211*c*. In a width direction orthogonal to a thickness direction of the second cushion layer 211, the central position of the first opening part 11*c* and the central position of the second opening part 211*c* are formed at the same position. A width W2 of the second opening part 211*c* of the second cushion layer 211 is formed to be smaller than a width W1 of the first opening part 11*c* of the first cushion layer 11.

The thickness of the second cushion layer 211 may be substantially the same as the thickness (for example, about 2 to 15 [mm]) of the first cushion layer 11. The second cushion layer 211 may be formed of, for example, polyurethane foam having a thickness of about 2 to 15 [mm] and a density of 20 to 35 [kg/m$^3$].

The laminated molded body 210 arranged as described above is set in a mold 50 and is bonded by thermocompression. Thereby, as illustrated in FIG. 15, a skin 15 is bonded to the second cushion layer 211 at the first opening part 11*c* of the first cushion layer 11 with an adhesive layer 12 provided therebetween. In addition, the skin 15 is bonded to the base material 13 at the second opening part 211*c* of the second cushion layer 211 with the adhesive layer 12 provided therebetween.

(Effect of Laminated Molded Body) Hereinafter, an effect of the laminated molded body 210 of the third embodiment will be described. In the laminated molded body 210 of the third embodiment, the second cushion layer 211 includes the second opening part 211*c* having a width smaller than the width of the first opening part 11*c* formed at the same position as that of the first opening part 11*c* (FIG. 15).

Two steps can be formed with a step formed at the first opening part 11*c* by bonding the skin 15 to the second cushion layer 211 and a step formed at the second opening part 211*c* by bonding the skin 15 to the base material 13. Therefore, the design of the laminated molded body 210 can be improved.

Note that other configurations and effects are substantially the same as those in the embodiments described above, and thus, the description thereof will be omitted.

Fourth Embodiment

A laminated molded body of a fourth embodiment is different from the laminated molded bodies of the first to third embodiments in that a configuration of a cushion layer is different.

Figure 16:
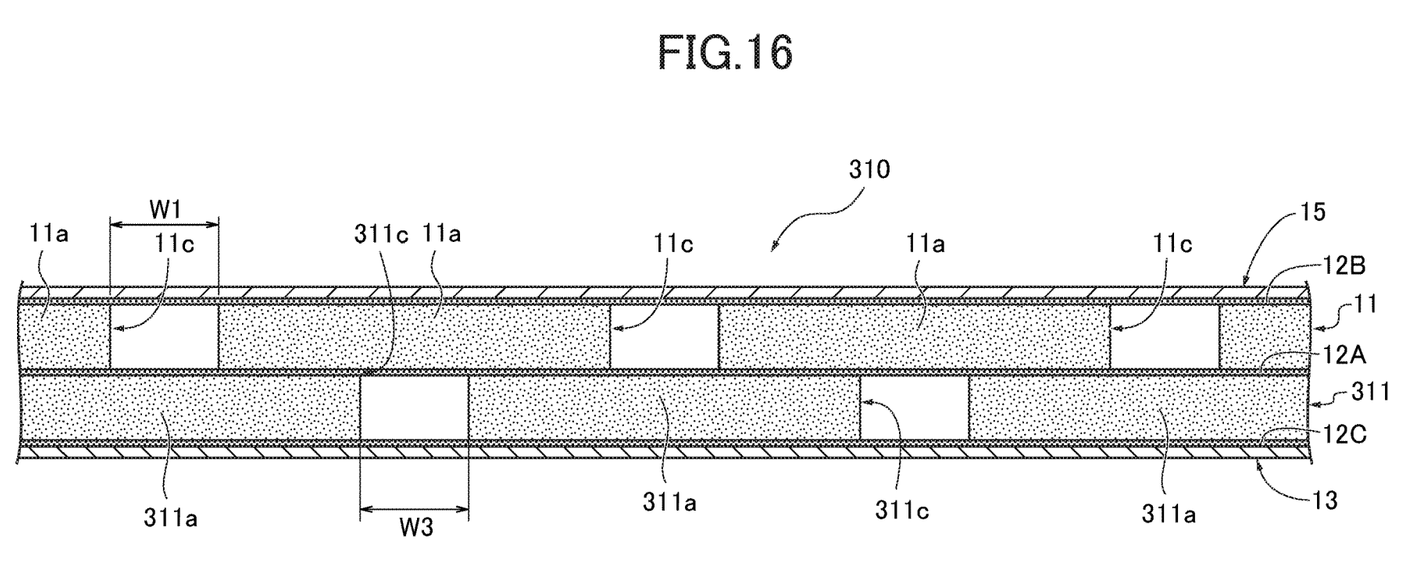
FIG. 16 is a cross-sectional view schematically illustrating an arrangement of a laminated molded body of a fourth embodiment.
Figure 17:
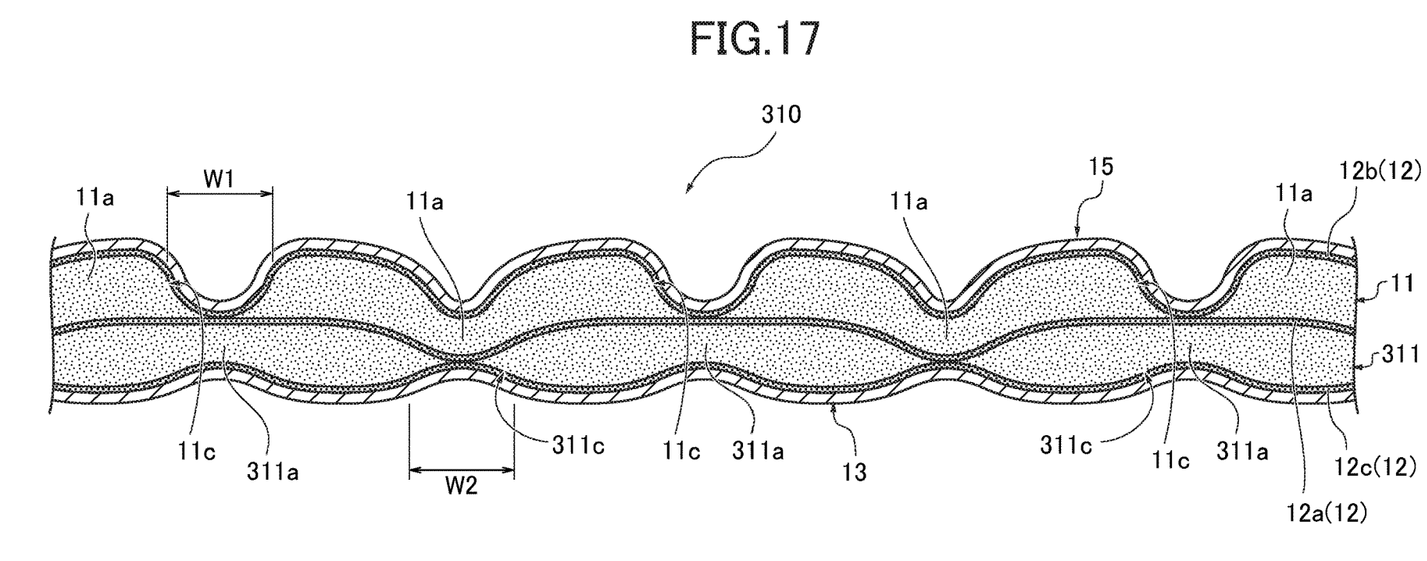
FIG. 17 is a cross-sectional view schematically illustrating the laminated molded body of the fourth embodiment.

(Configuration of Laminated Molded Body) FIG. 16 is a cross-sectional view schematically illustrating an arrangement of the laminated molded body of the fourth embodiment. FIG. 17 is a cross-sectional view schematically illustrating the laminated molded body of the fourth embodiment. Hereinafter, a configuration of the laminated molded body of the fourth embodiment will be described. Note that descriptions of the same or equivalent parts as those described in the embodiment described above will be described using the same terms or the same reference numerals.

As illustrated in FIG. 16, a laminated molded body 310 of the fourth embodiment includes a first cushion layer 11 as a cushion layer and a second cushion layer 311 as a cushion layer.

The first cushion layer 11 has the same configuration as the first cushion layer 11 of the first embodiment and includes a first opening part 11c.

The thickness of the second cushion layer 311 may be substantially the same as the thickness (for example, about 2 to 15 [mm]) of the first cushion layer 11. The second cushion layer 311 may be formed of, for example, polyurethane foam having a thickness of about 2 to 15 [mm] and a density of 20 to 35 [kg/m$^3$].

The second cushion layer 311 includes a main body part 311a, and a second opening part 311c formed at a position different from that of an opening part of the first cushion layer 11 in a width direction orthogonal to the thickness direction of the second cushion layer 311.

A width W1 of the first opening part 11c of the first cushion layer 11 may be substantially the same size as a width W3 of the second opening part 311c of the second cushion layer 311.

The laminated molded body 310 arranged as described above is set in a mold 50 and is bonded by thermocompression. Thereby, as illustrated in FIG. 17, a skin 15 is bonded to the second cushion layer 311 at the first opening part 11c with an adhesive layer 12 provided therebetween. The first cushion layer 11 is bonded to a base material 13 at the second opening part 311c with the adhesive layer 12 provided therebetween.

(Effect of Laminated Molded Body) Hereinafter, an effect of the laminated molded body 310 of the fourth embodiment will be described. In the laminated molded body 310 of the fourth embodiment, the second cushion layer 311 includes the second opening part 311c formed at a position different from that of the first opening part 11c, the skin 15 is bonded to the second cushion layer 311 at the first opening part 11c, and the first cushion layer 11 is bonded to the base material 13 at the second opening part 311c (FIG. 17).

A shape of irregularities formed on the surface of the skin 15 can be different from that of irregularities formed on the surface of the skin 15 by bonding the skin 15 to the second cushion layer 311 at the first opening part 11c and bonding the first cushion layer 11 to the base material 13 at the second opening part 311c. Therefore, the design of the laminated molded body 310 can be improved.

Note that other configurations and effects are substantially the same as those in the embodiments described above, and thus, the description thereof will be omitted.

The laminated molded body of the present invention has been described based on the first to fourth embodiments. However, the specific configuration is not limited to ones described in these embodiments, and changes in design, additions, combinations of the embodiments, and the like are allowed without departing from the gist of the inventions recited in claims.

Figure 18:
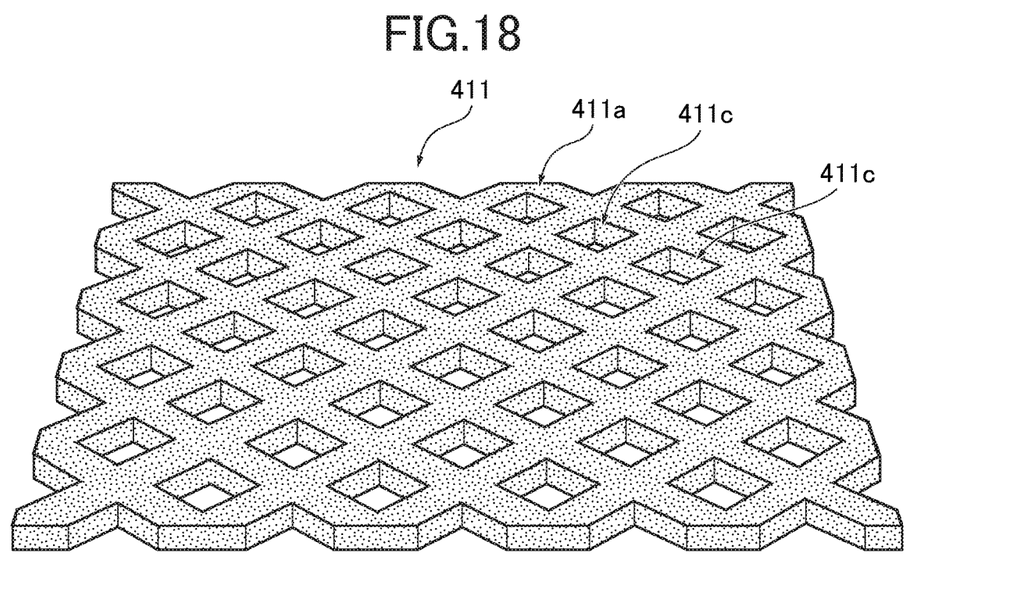
FIG. 18 is a perspective view illustrating a cushion layer of another embodiment.
Figure 19:
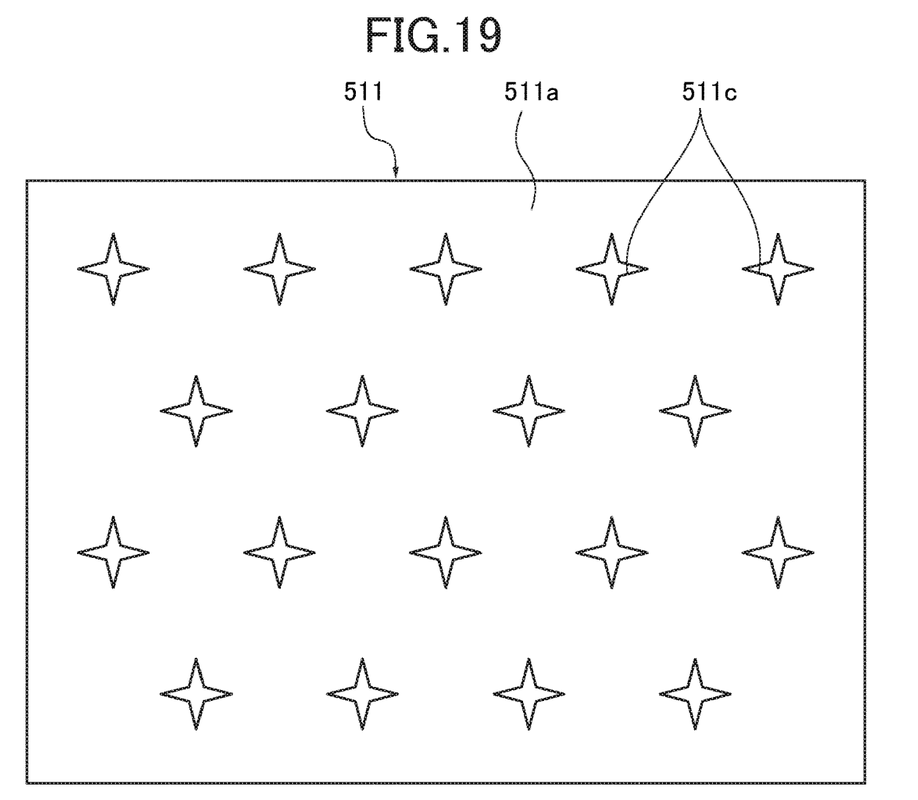
FIG. 19 is a plan view illustrating a cushion layer of another embodiment.

In the first to fourth embodiments, the first cushion layer and the second cushion layer include the opening parts to form a rhombic main body part. However, as illustrated in FIG. 18, each opening part 411c may be a hole. In addition, as illustrated in FIG. 19, each opening part 511c may be a star shape, a circular shape, a quadrilateral shape, or a triangular shape.

In the first to fourth embodiments, the first cushion layer and the second cushion layer are formed of polyurethane foam. However, the first cushion layer and the second cushion layer are not limited to the above, and resin foam such as polyethylene foam or polyester foam, or non-woven fabric may be used.

In the second to fourth embodiments, the thicknesses of the first cushion layer and the second cushion layer are substantially the same as each other. However, the thickness of the first cushion layer may be larger than the thickness of the second cushion layer, or the thickness of the second cushion layer may be larger than the thickness of the first cushion layer. Therefore, it is possible to implement the irregularities of the laminated molded body with a variety of designs.

In the second embodiment, the first opening part 11c is formed in the first cushion layer 11. However, the first opening part may be formed in the second cushion layer.

In the third embodiment, the width W2 of the second opening part 211c is smaller than the width W1 of the first opening part 11c. However, the width of the second opening part may be larger than the width of the first opening part.

In the fourth embodiment, the width W1 of the first opening part 11c of the first cushion layer 11 is substantially the same as the width W3 of the second opening part 311c of the second cushion layer 311. However, the width of the opening part of the first cushion layer and the width of the opening part of the second cushion layer can be different from each other. Therefore, it is possible to implement the irregularities of the laminated molded body with a variety of designs.

In the third embodiment, the first opening part 11c and the second opening part 211c are formed at the same position. In addition, in the fourth embodiment, the first opening part 11c and the second opening part 311c are formed at different positions. However, the first opening part and the second opening part may be formed to partially overlap with each other.

In the first to fourth embodiments, the laminated molded body of the present invention is applied to the center portion in the vehicle width direction of the vehicle seat. However, the laminated molded body of the present invention may also be applied to a peripheral part of a vehicle seat. In addition, the laminated molded body of the present invention may also be applied to a door trim of a vehicle, a center console of a vehicle, furniture, and the like.

The invention claimed is:

1. A method for manufacturing a laminated molded body, the method comprising:
- a cutting-out step for cutting out a cushion layer to form a cut-out part;
- a base material laminating step for forming a first laminated body by arranging a base material on a lower surface of the cushion layer cut out in the cutting-out step with an adhesive sheet provided therebetween and having an adhesive force by heating;
- an insulating material placing step for attaching an insulating material to the cut-out part of the first laminated body;
- a first thermocompression bonding step for bonding by thermocompression the first laminated body to which the insulating material is attached;
- a removing step for removing the cut-out part from the first laminated body bonded by thermocompression in the first thermocompression bonding step to form an opening part;
- a skin laminating step for forming a second laminated body by arranging a skin on an upper surface of the first laminated body from which the cut-out part is removed with an adhesive sheet provided therebetween and having an adhesive force by heating; and
- a second thermocompression bonding step for bonding the skin at the opening part to a lower layer material by bonding the second laminated body by thermocompression, the lower layer material being arranged below the cushion layer having the opening part.

2. The method for manufacturing the laminated molded body according to claim 1, wherein
- in the second thermocompression bonding step, a mold having flat dividing surfaces is used, and
- the opening part has a width of 70% or more of a thickness of the cushion layer.

* * * * *